United States Patent [19]

Grimsley et al.

[11] Patent Number: 4,581,769
[45] Date of Patent: Apr. 8, 1986

[54] RADAR WARNING RECEIVER

[75] Inventors: Richard L. Grimsley, Mason; Michael D. Valentine, Cincinnati, both of Ohio

[73] Assignee: Cincinnati Microwave, Inc., Cincinnati, Ohio

[21] Appl. No.: 575,422

[22] Filed: Jan. 31, 1984

[51] Int. Cl.⁴ .................... H04B 17/00; G01R 23/16; G01S 7/28

[52] U.S. Cl. .................... 455/226; 340/902; 343/17.1 R; 324/77 CS

[58] Field of Search ............... 324/77 C, 77 CS, 77 B; 455/226, 145–148; 343/17.1 R, 18 E; 340/902, 903

[56] References Cited

U.S. PATENT DOCUMENTS 4,118,666 10/1978 Bernstein .................... 324/77 B
4,313,216 1/1982 Jaeger et al. .................... 455/226

Primary Examiner—Marc E. Bookbinder
Assistant Examiner—Andrew J. Telesz, Jr.
Attorney, Agent, or Firm—Wood, Herron & Evans

[57] ABSTRACT

A radar warning receiver includes means for distinguishing pulsed or continuous fixed frequency radar signals emanating from a radar transmitter from variable frequency signals such as those radiated from a nearby superhomodyne receiver. This invention includes a superheterodyne receiver having a local oscillator that is repeatedly varied in frequency over a range of frequencies sufficiently large and at a rate fast enough to cause any signals within an input range of frequencies to be detected by a sensitive, limited bandwidth detector. If an input signal is fixed in frequency, that signal will be detected at the same time during successive sweeps of the local oscillator, and a correlated output will be generated; otherwise, an uncorrelated output will be generated. If the number of correlated outputs equal or exceed the uncorrelated outputs detected, then an alarm is provided. Even when the receiver of this invention is receiving signals from a superhomodyne receiver, if a fixed frequency signal is detected for a predetermined number of consecutive sweeps of the local oscillator, then an alarm, indicating the presence of that fixed frequency signal, is again provided.

20 Claims, 9 Drawing Figures

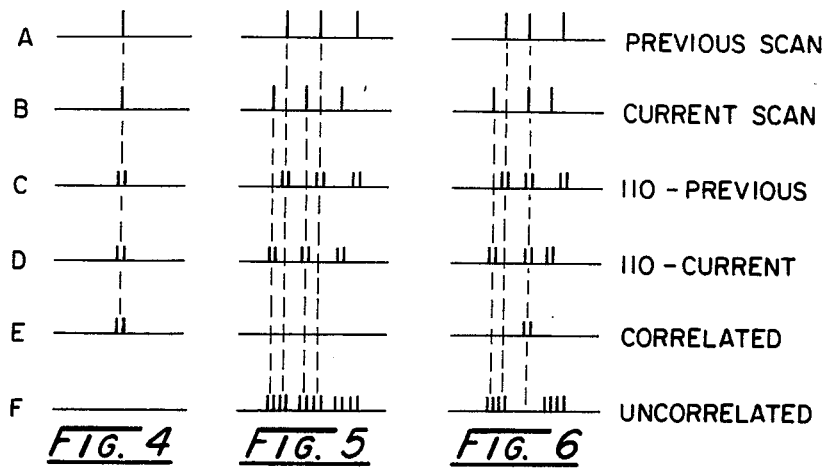
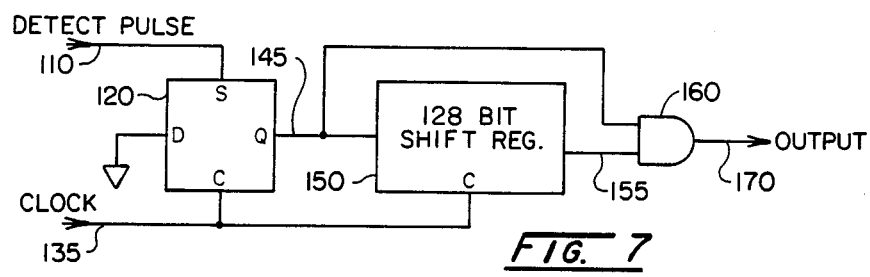
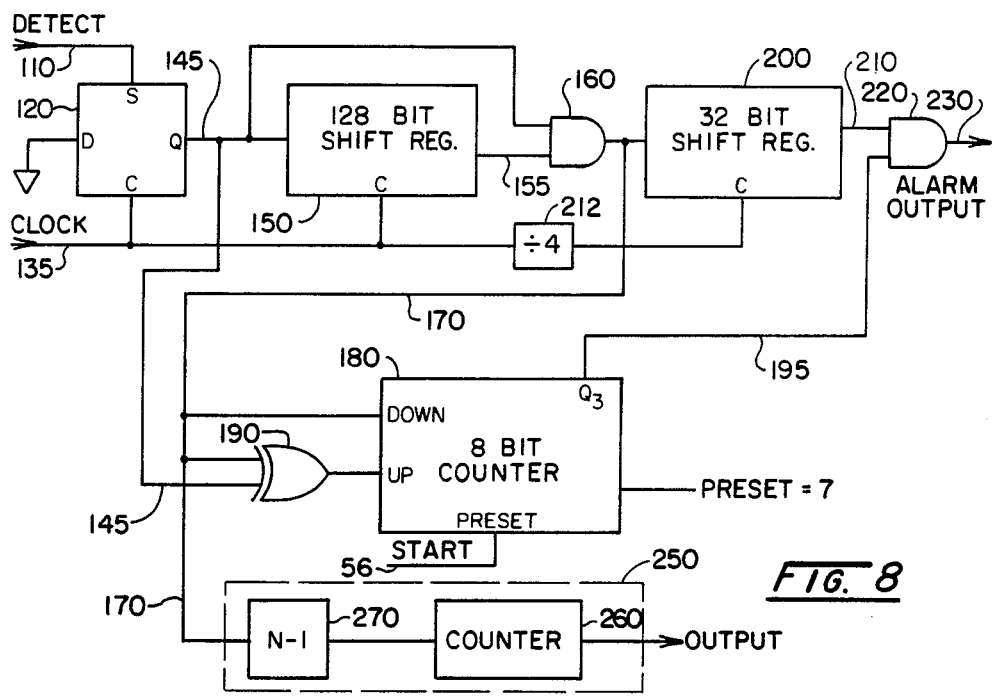

RADAR WARNING RECEIVER

BACKGROUND OF THE INVENTION

This invention relates to a radar receiver capable of discriminating between fixed frequency and variable frequency signals in the X- and K-band portions of the radio spectrum.

This invention is particularly useful in connection with a receiver designed to detect signals emitted by police speed radar detectors, and to distinguish those fixed frequency signals from other signals emitted by nearby superheterodyne-type radar detectors.

Some newly manufactured radar receivers have been introduced to the marketplace using the so-called superhomodyne scheme for detecting frequencies in the X- and K-bands. These receivers use a signal generator or local oscillator on the same frequency as the signal to be received, and this internal signal tends to be re-emitted by the antenna of the receiver. Although its power level is low, the proximity of a receiver of this type to a sensitive receiver could make it appear that a radar transmitter is in the vicinity, thus sounding an alarm. Since the local oscillator in a superhomodyne receiver is at the same frequency as the received signal, it is impossible to trap that signal and thus prevent it from being reradiated by the antenna.

Thus, receivers of the superhomodyne type are continuously broadcasting X- and K-band signals. They do have one characteristic, however, that permits their signals to be distinguished from police radar signals, and that is the frequency of the superhomodyne emitted signal is constantly varying over the range of frequencies that it is designed to detect.

Accordingly, this invention provides means for distinguishing between the fixed frequency emission of a police radar transmitter and the varable frequency emissions from a superhomodyne-type receiver.

SUMMARY OF THE INVENTION

In the present invention, a superheterodyne receiver includes a local oscillator which is varied or swept across a range of frequencies so as to cause a predetermined range of X- and K-band frequencies to be swept. The output of the local oscillator, when mixed with the input signal, produces an intermediate frequency (IF) that is applied to a highly sensitive, limited bandwidth detector circuit. The time when a signal is detected during each sweep of the local oscillator will be representative of the frequency of that signal, and since signals emitted by a transmitter are fixed in frequency, whereas those emissions from a superhomodyne receiver vary in frequency, it will be possible, through appropriate circuitry to be described, to distinguish between these two sources of radio frequency energy.

More specifically, this invention includes means for correlating the output of the receiver during successive sweep cycles of the local oscillator, and to provide an alarm output whenever a correlation for a predetermined number of cycles is found.

This is done by comparing the frequency of the detected radio frequency signal during each sweep of the local oscillator, and whenever the detected radio frequency signal occurs at the same frequency during multiple sweeps of the local oscillator, an alarm output is provided.

Because a large number of uncorrelated signals can statistically produce the appearance of a correlated signal, this invention provides an alarm output when the number of correlated signals equals or exceeds the number of uncorrelated signals detected.

Further, because the presence of a superhomodyne receiver adjacent a receiver incorporating this invention could possibly mask the presence of a single frequency signal emitted by a radar transmitter, this invention also provides means for generating an alarm output whenever the number of consecutive sweeps of the local oscillator, each including at least one correlated signal, exceeds a predetermined number.

It is therefore an object of this invention to provide an apparatus for distinguishing pulsed or continuous signals emitted from a fixed frequency source from other signals generated by a variable frequency source, said apparatus comprising: a superheterodyne receiver including means for sweeping the frequency of the local oscillator over a predetermined range of frequencies thereby providing output pulses during each sweep of the local oscillator upon the detection of signals within the receiver bandpass, wherein the positions of the output pulses during said sweep are representative of the frequencies of the corresponding detected signals, correlation means for providing an alarm output each time an output pulse occurs at the same position during a predetermined number of sweeps of the local oscillator.

Other objects and advantages of the invention will be apparent from the following description, the accompanying drawings and the appended claims.

BRIEF DESCRIPTION OF THE DRAWINGS

FIGS. 4–6 each contain a set of waveforms wherein waveform A represents an input signal detected during a previous sweep of the local oscillator; waveform B represents the signals detected during the current sweep of the local oscillator; waveform C represents the detect pulse outputs from the previous sweep; waveform D represents the detect pulse outputs from the current sweep; waveform E represents correlation between detect pulses; and, waveform F represents uncorrelated pulses.

FIG. 7 is a simplified electrical block diagram illustrating the principal of this invention.

FIG. 8 is a simplified electrical block diagram further illustrating the invention.

DESCRIPTION OF THE PREFERRED EMBODIMENT

Figure 1:
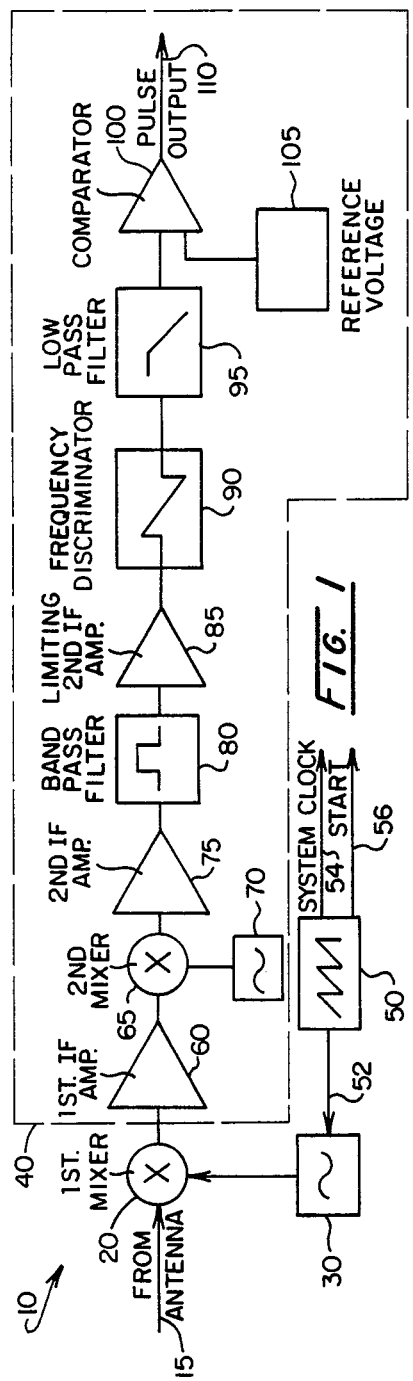
FIG. 1 is an electrical block diagram showing the components comprising the receiver portion of the invention.

Referring now to the drawings which illustrate the preferred embodiment of the invention, and particularly to the block diagram of FIG. 1, a radar receiver 10 is illustrated wherein a radar signal occurring within a specified input range of frequencies is received by a conventional antenna system, not shown, and directed on line 15 to a first mixer 20. The antenna may be of conventional design, and as customary for radar receivers of this type, it may include filters for preventing signals at unwanted frequencies from being passed to the first mixer 20. The antenna may also include other filters for preventing outward radiation of internally generated radio frequency signals. The first mixer 20 may be and is generally built into and made a part of the antenna structure.

A local oscillator 30 provides an output signal to the first mixer 20 such that the resulting intermediate frequency signal will fall within the limited response bandwidth of the detector circuit 40. In a preferred embodiment of the invention, two quasi-harmonically related radar frequencies can be detected by a single receiver. These radar frequencies are nominally at 10.525 GHz with a tolerance of ±0.025 GHz (X-band), and at 24.150 GHz with a tolerance of ±0.100 GHz (K-band). By selecting the frequency of the local oscillator 30 to be in the order of 11.5583 GHz, the fundamental or first harmonic of the local oscillator, when mixed with the 10.525 X-band radar signal will result in a difference or intermediate frequency of 1.033 GHz. The second harmonic of the local oscillator 30, when mixed with a K-band radar signal at 24.150 GHz will also provide an intermediate frequence of 1.033 GHz. Thus, a single receiver may be designed to receive both X- and K-band radar signals simultaneously.

Since the radar signals may be within a range of frequencies rather than on a single frequency, it will be necessary to vary or sweep the frequency of the local oscillator 30 through a range of approximately 0.120 GHz, or from 11.4983 to 11.6183 GHz. This sweeping of the local oscillator is accomplished by means of a sweep generator 50.

The output of the sweep generator 50 on line 52 to the local oscillator 30 is a variable voltage which changes in a generally sawtooth manner with respect to time. Also provided is a signal on line 54 from the system clock, and a signal on line 56 which is a start signal representing the start of each sweep cycle.

The detector circuit 40 includes a first intermediate frequency (IF) amplifier 60 for receiving the intermediate frequency output of the first mixer 20 and applies the amplified signal to a second mixer 65. A second local oscillator 70 is preferably a fixed frequency device having an output at 1.03 GHz so that the difference between the output of the first IF amplifier 60 and the local oscillator 70 is a 10 MHz signal applied to a second intermediate frequency (IF) amplifier 75. A filter circuit 80 has a limited bandpass, in the order of 1.3 MHz, and its output is applied through a limiting second IF amplifier 85 to a frequency discriminator circuit shown at 90. The output of the frequency discriminator is processed by lowpass filter 95 and applied to a voltage comparator circuit 100 which compares the filter output to a reference voltage provided by source 105. As a result, the comparator circuit 100 will provide a detect pulse output on line 110 for each radar signal detected within the input range of frequencies. Actually, because of the nature of the detector circuit 40, and the use of a second local oscillator 70, a pair of detect pulses will be generated for each signal found within the input range of frequencies. The spacing between these pulses may be used, if desired, to identify whether the input signal is located in the X- or K-band. This feature of the detector circuit 40 is more fully described in U.S. Pat. No. 4,313,216.

Some other types of police radar detecting receivers themselves generate radio frequency signals within the range of frequencies assigned to police radar, and detection of these receiver generated radio frequency signals could result in a false alarm, i.e., an indication that a radar output signal has been detected when in fact the only thing present in the range of frequencies are low power, varying frequency signals from a nearby receiver. Thus, means have been provided in this invention for distinguishing the pulsed or continuous signals emitted from a fixed frequency source, such as a police radar transmitter, from other signals generated by variable frequency sources, such as radar receivers. Accordingly, means are provided to respond to fixed frequency input signals, but to reject variable frequency input signals.

The time relation or position of the detect pulse on line 110 from the comparator 100 with respect to the beginning of each sweep is representative of the frequency of the detected signal since the variable frequency of local oscillator 30 is swept through the same range of frequencies during each cycle of the sweep generator 50.

Figure 3:
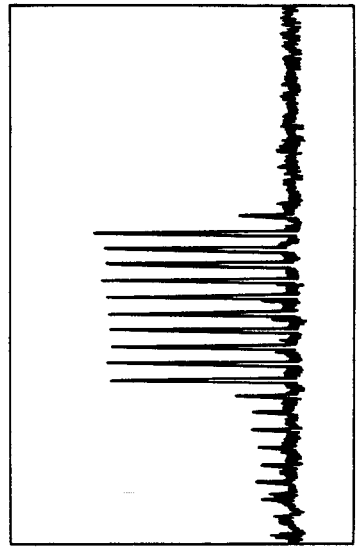
FIG. 3 is a waveform diagram showing the output of a superhomodyne receiver when viewed on a spectrum analyzer.
Figure 2:
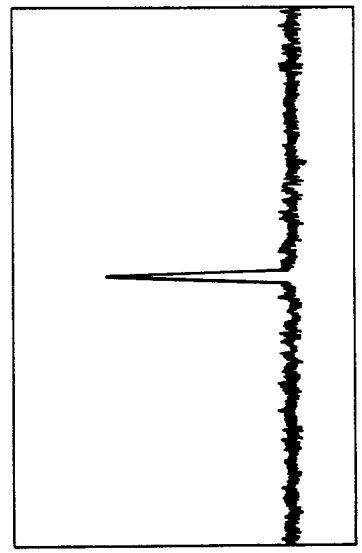
FIG. 2 is a waveform diagram showing an X-band police radar as viewed on a spectrum analyzer.

This is illustrated in FIGS. 2 and 3 where the horizontal axis represents frequency and the vertical axis represents the amplitude of the signals detected within the range of frequencies scanned by the receiver. The range of frequencies may be, for example, from 10.475 to 10.575 GHz. The single signal shown in FIG. 2 is at approximately 10.525 GHz. Thus, this signal will be detected approximately midway during the sweep of the local oscillator. In FIG. 3, several input signals are represented, some with relatively large amplitudes, in the range of from 10.500 to 10.530 GHz.

Any signal of constant frequency will remain in the same relative position during each sweep. If any signal varies in frequency, then that signal will, of course, be detected at different times, or at different positions, from sweep to sweep of the local oscillator.

Which one, if any, of the signals in FIG. 3 is from a radar transmitter? Amplitude alone cannot determine this, since the radar transmitter signal can be much weaker than a nearby variable frequency signal from a radar receiver. To determine the radar transmitter signal, reference will be made to the simplified waveforms of FIGS. 4-6 which illustrate three typical situations: where police radar alone is detected; where only signals from a radar receiver are detected; and, where a police radar signal is detected along with signals from a radar receiver.

In each of FIGS. 4, 5 and 6, waveform A represents the signals detected during the previous sweep of the local oscillator 30; waveform B represents the signals detected during the current sweep of the local oscillator; waveform C represents the detect pulse outputs on line 110 from the detector circuit 40 for the previous sweep; waveform D represents the detect pulse outputs on line 110 during the current sweep; waveform E indicates correlated detect pulses of the previous and the current sweep; and waveform F indicates the uncorrelated pulses between the previous and the current sweep of waveforms C and D.

In FIG. 4, a single, fixed frequency radar signal is present at the antenna, and this signal remains at the same frequency during the scan represented by waveform A and the scan represented by waveform B. As previously noted, the output pulse 110 from the detector circuit 40 will be a double pulse (because the second local oscillator 70 is very close to the first IF frequency), and this double pulse will appear in both waveforms C and D at the same position, or at the same time with respect to the beginning of the scan, since frequency is constant. Means are provided to sense the correlation between the time-position of the pulses of waveforms C and D, and this is represented as the correlated output pulse in waveform E.

In FIG. 5, only frequency variable radio frequency signals are detected at the antenna, and because they are variable in frequency, their position with respect to the beginning of the scan varies from scan-to-scan, as shown in waveforms A and B. Accordingly, the detect pulses on line 110 from the previous and the current scan will appear at different times, as shown by waveforms C and D. Since the pulses are not correlated, there is no output shown in waveform E, but the pulses do appear in waveform F.

In FIG. 6, three radio frequency signals are detected in the previous scan of waveform A, only one of which is from a fixed frequency source. In the current scan of waveform B, the variable frequency signals have changed position, but the fixed frequency signal remains at the same position. Accordingly, when the detect output pulses of waveforms C and D are compared, one set of detect pulses will appear in waveform E as representing the fixed frequency source, whereas the other detect pulses will appear in waveform F as uncorrelated detect pulses.

In this invention, means are provided to discriminate against detect pulses on line 110 representing variable radio frequency signals, by comparing the frequency of these signals during each sweep of the local oscillator 30. Only when the radio frequency signals occur at the same frequency during multiple sweeps of the local oscillator is an alarm output provided.

Figure 9:
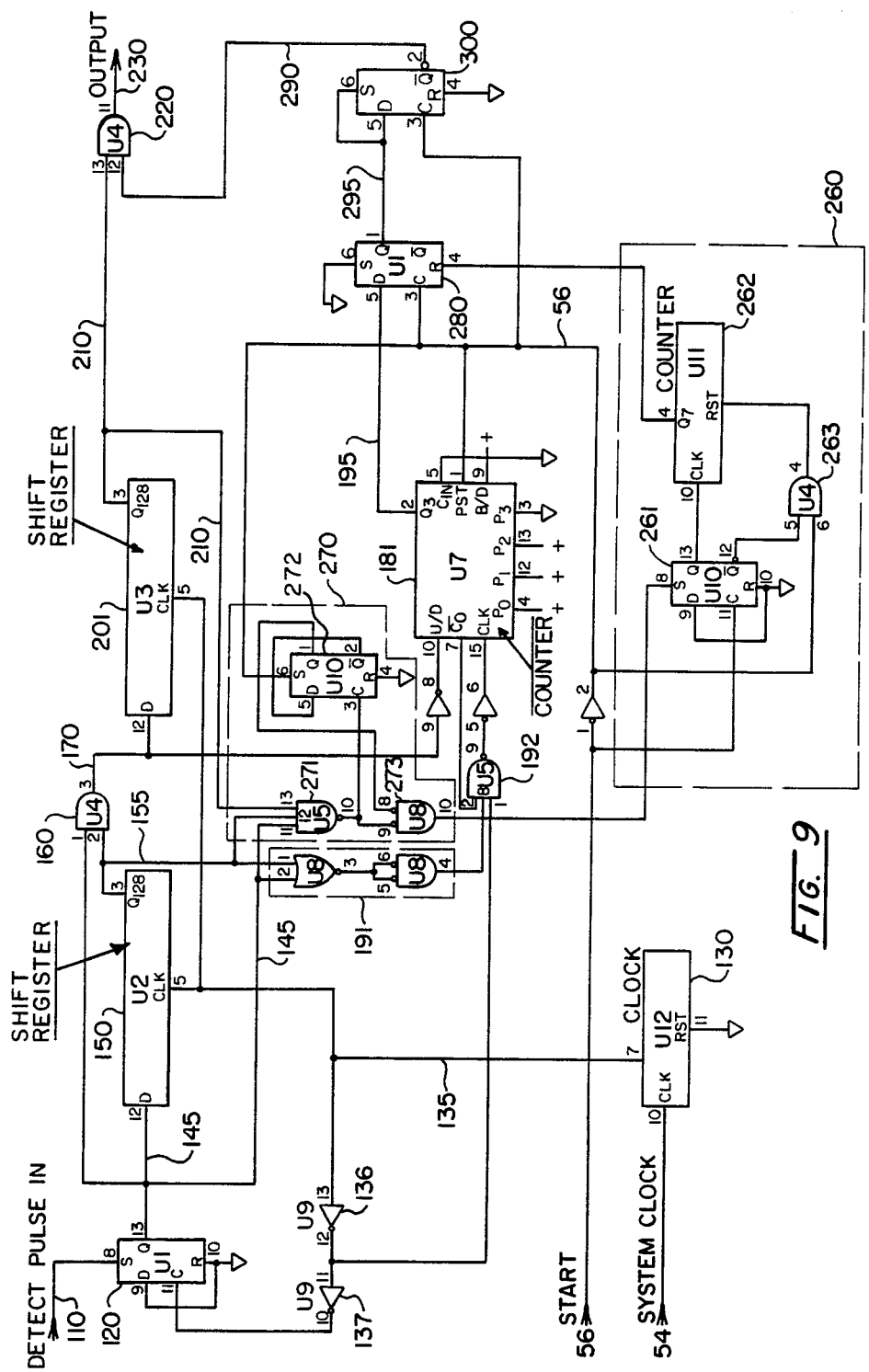
FIG. 9 is an electrical block diagram showing a preferred embodiment of the invention

FIG. 7 illustrates a simplified version of a device for accomplishing this and includes input buffer 120 for receiving the detect pulses on line 110 from the detector circuit 40, and for converting these detect pulses into a pulse synchronized with clock pulses occurring on line 135 from a clock 130 (FIG. 9). The clock pulses occur at regular intervals and divide each sweep of the local oscillator into a fixed number of increments, for example, 128 pulses for each sweep cycle. The output of the flip-flop 120 is applied to a 128 bit shift register 150. For each clock pulse, any information appearing on line 145 is moved into and through the shift register. The output of the shift register on line 155 is applied to one input of AND gate 160, the other input of which is line 145. Thus, the AND gate 160 compares the detect pulses from the current sweep found on line 145 to the detect pulses occurring on the previous sweep of the local oscillator as found on line 155. An alarm output on line 170 will occur only when there is a coincidence of these signals.

Because the variable frequency source signals may be numerous, as shown in FIG. 3, there exists the possibility that there will be an apparent coincidence of signals in adjacent scans of the local oscillator even though a fixed frequency signal is not present. For this reason, the preferred embodiment of the invention includes means to provide an alarm output when the number of correlated signals exceeds the number of uncorrelated signals by a predetermined number. An example of a circuit for performing this function is shown in the block diagram of FIG. 8.

This embodiment includes those same elements shown in FIG. 7, and in addition, a counter 180 which is initially preset to a predetermined number, such as 7, upon receipt of the retrace signal 56 from the sweep generator 50. Thus, the counter starts at a preset number at the beginning of each sweep of the local oscillator, and whenever a correlated output is generated on line 170, the counter will decrement by one. Uncorrelated detect pulses, on the other hand, cause the counter 180 to increment. This is accomplished by applying each detect pulse on line 145 to an exclusive OR device 190 along with the correlated signal from line 170. Thus, if a detect pulse on line 145 corresponds to a correlated signal on line 170, the counter 180 is not incremented; but if a detect pulse on line 145 is not correlated with a signal from a previous sweep, then the counter 180 will be incremented.

At the end of the sweep cycle, if the number in the counter 180 exceeds the preset number, then the number of uncorrelated detect signals exceeds the number of correlated signals and an alarm output will be inhibited. On the other hand, if the number of correlated signals exceeds or equals the number of uncorrelated signals, then an alarm output will be enabled.

In order to determine whether the conditions mentioned above are met at the end of a sweep cycle, a second shift register 200 is provided to store temporarily the correlated output signals during each sweep. As shown in FIG. 8, the shift register 200 is a 32 bit register, and a divide by four counter 212 reduces the number of clock pulses from 128 per sweep to 32 per sweep. The output of the counter 180 on line 195, and the output of the shift register 200 on line 210 are applied to an AND gate 220. This gate will provide an alarm output on line 230 only if there are correlated pulses in shift register 200 and the number of correlated pulses sensed by the counter 180 equals or exceeds the number of uncorrelated pulses occurring during the current sweep.

Also shown in FIG. 8 is a simplified version of a fail-safe circuit 250 which is designed to provide an alarm output after a predetermined number of consecutive sweep cycles each include at least one correlated signal even though there are more uncorrelated signals than correlated signals present during each sweep. This is designed to prevent a failure of the detector from providing an alarm output even though a fixed frequency radar signal is masked by variable frequency input signals existing over a long period of time. The fail-safe circuit includes a counter 260 receiving the correlated signals on line 170 through a "N−1" counter circuit 270. The counter circuit 270 is merely for reducing by one the number of pulses applied to the counter 260. As may be noted in waveforms E of FIGS. 4 and 6, each correlated detect pulse is actually a pair of pulses, and the circuit 270 is provided to eliminate one of these pulses.

Referring now to the schematic drawing of FIG. 9, which shows a preferred embodiment of the invention using CMOS technology, the detect pulses on line 110 are applied to the input buffer 120. This buffer is a D-type flip-flop for converting the detect pulses on line 110 which come in in an asynchronous fashion, into synchronous pulses under control of the clock pulses on line 135 so that pulses within the remainder of the circuit are synchronized, thus standardizing the timing.

As shown in FIG. 9, the clock pulses on line 135 are generated by a clock 130. This clock, or divider, receives system clock pulses from the main receiver and divides them by a factor of four. Since the start pulses on line 56 occurs at a 64 Hz rate, the clock generates 128 clock pulses for each sweep of the local oscillator 30. In other words, the entire sweep of the local oscillator is divided into 128 segments, each 3.906 milliseconds in duration.

As shown in FIG. 9, the clock pulses on line 135 in some cases go directly to the various components within the circuit, and in other cases they go through inverters 136 and 137. The reason for this is that various components require different polarity clock pulses in order to work properly within this circuit.

The output of the input buffer 120 is applied on line 145 to the shift register 150. This device functions as a delay line of one sweep length. It is a 128 bit shift register, and it too is controlled by the clock pulses on line 135. Any signal entering the shift register on line 145 will exit the shift register on line 155 after 128 pulses from the clock have occurred. Thus, the shift register 150 will hold one entire sweep's worth of data, and its output on line 155 represents the input detect pulses delayed by one sweep. These pulses are compared to the current input detect pulses by AND gate 160. As previously stated, the output on line 170 will occur only when these two pulses are correlated, or in other words, there is a coincidence of signals.

Both the present detect pulses on line 145 and the previous detect pulses on line 155 are applied to an OR gate 191. The OR gate has an output connected to AND gate 192, the output of which is applied as an input to a counter 181. Any signal, correlated or uncorrelated, coming from either lines 145 or 155 will be applied as an input to the counter 181. This counter also has an input at pin 10 from line 170, which represents the correlated detect signals. Whether the counter increments or decrements upon the application of detect pulses to pin 15 from AND gate 192 will depend on whether there is a correlated signal present. The counter 181 will count up if no correlated signal is present; it will count down if there is a correlated signal on line 170.

At the beginning of each sweep, counter 181 is preset by the start signal on line 56 from the sweep generator 50. The start signal is applied to pin 1 and causes whatever input is applied to the preset inputs (P0, P1, P2 and P3) to be loaded or preset into the counter. In FIG. 9, P0, P1 and P2 are connected to a source of voltage whereas terminal P3 is grounded. Therefore, the counter 181 is preset to the binary equivalent of the decimal number 7. The B/D input of the counter 181 determines whether the counter will count in a decimal or binary fashion, and since this is connected to a source of voltage, the counter will count in binary.

As the local oscillator sweeps across the input range of frequencies, and as a correlated signal is encountered, the counter 181 will decrement down from 7 to 6 to 5 as the two detect pulses are received, as illustrated in FIG. 4. If uncorrelated signals are encountered, the counter will increment from 7 to 8 to 9; each uncorrelated input signal being represented by a pair of detect pulses.

The counter 181 is prevented from exceeding its maximum capacity (decimal 15) by connecting the output from pin 7, the $\overline{CO}$ output, to one of the inputs of AND gate 192. When the counter 181 reaches its maximum capacity, the enabling voltage on pin 7 will be removed, and no further input signals will be permitted to pass through the gate 192 into the counter. The output of the counter 181 is on pin 2 or the Q3 output, which corresponds to the value of $2^3$ or the decimal value of 8.

At the end of the sweep, the output of the counter 181 is clocked into a storage register 280. In FIG. 9, this register is a D-type flip-flop. This is done by connecting the Q3 output on line 195 of the counter 181 to the "D" input of the flip-flop 280.

Correlated signals on line 170 are also applied to a shift register 201. This is a similar to the shift register 200 of FIG. 8; however, shift register 201 in this embodiment of the invention is a 128 bit device. Therefore, it stores the correlated output signals from the shift register 150, further delayed by one sweep of the local oscillator. As previously explained, it is necessary to store the correlated detect pulses until it is determined whether these correlated pulses equal or exceed the number of uncorrelated pulses. Therefore, the shift register 201 stores these pulses until the comparison can be made by the counter 181.

In the presence of a large number of uncorrelated signals, there is a possibility that many will be apparently correlated, even though no fixed frequency source is in fact detected. Occasionally, the number of apparent correlated signals will be greater than the number of uncorrelated signals detected by the circuit, and under these circumstances, the output of the counter 181 would indicate the presence of a radar signal. However, the probability that this condition will occur during two consecutive sweeps is quite low. Therefore, the present invention includes circuit means for rejecting any alarm output under these circumstances, and does so by requiring that at least two consecutive valid outputs occur from the counter 181.

If the number of uncorrelated pulses exceeds the number of correlated pulses, then the Q3 output on line 195 from the counter 181 will be high. Output 195 is applied to the D input of register 280, and when the start pulse on line 56 is received, the Q output of this device will go high. Since this output on line 295 is connected to both the D and the set inputs of register 300, that register will immediately be set, and its $\overline{Q}$ output on line 290 will be low, thus removing the enabling signal on line 290 to the gate 220. Under these circumstances, those correlated signals stored in register 201 will not be permitted to pass through the gate 220 to the output circuitry.

On the other hand, if the output of counter 181 on line 195 is low, indicating that there are more correlated signals than uncorrelated signals detected, then register 280 will be reset upon receipt of the start pulse, the output on 295 will be low, and register 300 will reset upon the next clock pulse on line 56, provided the output on line 195 remains low. Thus, two consecutive sweeps are required wherein the output on line 195 must be low in order to cause an alarm output to be enabled through gate 220.

Turning now to the fail-safe circuit 250, in the event that there is a legitimate signal emanating from a radar transmitter is detected, but this is being masked by a nearby receiver generating a large number of variable frequency signals, and therefore the number of uncorrelated pulses exceeds the number of correlated pulses during each sweep, means are provided to sound an alarm, provided there is a predetermined number of consecutive sweeps of the local oscillator during which a correlated signal is found in each. In other words, after the receipt of a given number of known valid or correlated input detect signals, an alarm will be sounded notwithstanding the presence of uncorrelated detect signals.

The fail-safe circuit senses the correlated input signals by means of the circuit 270, and divides the number of pulses detected by two. As noted above, each valid or correlated input signal is represented by a pair of detect pulses, and for convenience, one of these pulses is eliminated from consideration before further processing.

First of all, AND gate 271 correlates three separate input signals: one from line 145, representing the current sweep input; the second from line 155, representing the previous sweep; and the third from line 210, representing the output of the second shift register 201. Thus, for AND gate 271 to provide an output, it must find correlation among three detect pulses during three consecutive sweeps of the local oscillator.

The output of AND gate 271 is applied to the D-type flip-flop 272. This device, along with gate 273, acts as a divide-by-two circuit, and functions in the following manner. When correlation is found among the three detect pulses mentioned above, an output from gate 271 will be applied to toggle the flip-flop. The flip-flop is set at the beginning of each sweep with a start signal on line 56, and since it is set, one input to gate 273 is disabled. Therefore, the first detect pulse that passes through gate 271 is prevented from propagating through gate 273 to the remainder of the fail-safe circuit. This first pulse, however, will toggle the flip-flop, and therefore the second of the pair of pulses will pass through gate 273 to the circuit shown generally at 260. This second pulse will also toggle flip-flop 272 and return the circuit to the condition mentioned above.

The output of gate 273 will be applied to set flip-flop 261, and its output is applied to increment counter 262. At the same time, the $\overline{Q}$ output will inhibit any start signal on line 56 from passing through gate 263 to reset the counter 262.

Thus, as long as two detect pulses are sensed by the circuit 270 during each sweep, flip-flop 261 will be set, and as long as flip-flop 261 is set during each sweep cycle, the start pulse is prevented from being applied to reset the counter 262. If 64 consecutive sweeps each contain a correlated output signal, then the counter 262 will generate an output at Q7, and a reset signal will be applied to the R input of register 280, forcing the Q output on line 295 of that device low. Upon the next start pulse on line 56, the register 300 will reset and an enabling voltage will be present on line 290 and the correlated signal stored in register 201 will pass through AND gate 230 to provide an alarm.

On the other hand, if a pair of detect pulses does not successfully propagate through gate 271 then flip-flop 261 will not be set, and a start pulse on line 56 may therefore pass through gate 263 to reset counter 262.

Sixty-four consecutive sweeps, each containing a correlated signal, was selected because having a number less than that made the receiver tend to provide alarms at an unacceptable rate in a high radio frequency pollution environment, whereas making the number significantly larger than 64 would increase the delay in sounding an alarm even though a valid fixed frequency signal had been detected. Sixty-four sweeps of the local oscillator represents approximately 1 second of time.

In the embodiment of the invention illustrated in FIG. 9, the following components are used, although it is to be understood that this circuit could take other forms and be implemented in other ways without departing from the scope of this invention.

| Reference Number | Component Number | Item |
|---|---|---|
| 120,280,300 | U1 | Type 4013 flip-flop |

-continued

| Reference Number | Component Number | Item |
|---|---|---|
| 150 | U2 | Type 4562 shift register |
| 201 | U3 | Type 4562 shift register |
| 160,220, 263,285 | U4 | Type 4081 AND gate |
| 192,271 | U5 | Type 4023 NAND gate |
| 181 | U7 | Type 4029 up-down counter |
| 191,273 | U8 | Type 4001 gates |
| 136,137, 264 | U9 | Type 4049 inverters |
| 270 | U10 | Type 4013 flip-flop |
| 262 | U11 | Type 4040 counter |
| 130 | U12 | Type 4040 counter |

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. An apparatus for distinguishing pulsed or continuous signals emitted from a fixed frequency source from other signals generated by a variable frequency source, said apparatus comprising:
   a receiver having a local oscillator and including
   first means for sweeping the frequency of the local oscillator over a predetermined range of frequency;
   second means for mixing said local oscillator signal with said received pulsed or continuous signals and for providing output pulses during each sweep of the local oscillator in response to detection of signals within the receiver bandpass, wherein the time of occurrence of the output pulses during said sweep relative to a zero time reference defined by the beginning of the sweep are representative of the frequencies of the corresponding received signals,
   correlation means for providing an alarm output in response to repeated occurrences of an output pulse at the same time relative to said zero time reference during a first predetermined number of sweeps of the local oscillator substantially independent of amplitude variations of said repeated output pulses.

2. In an apparatus for detecting the presence of continuous or pulsed radio frequency signals within an input range of frequencies, said apparatus including:
   a local oscillator,
   a limited bandwidth detector circuit,
   means for sweeping the frequency of the local oscillator over a range sufficiently large, and at a rate fast enough that any radio frequency signal occurring within said input range of frequencies will fall within the limited response bandwidth of said detector circuit,
   said detector circuit providing a detect output pulse in response to sensing a radio frequency signal within its limited bandwidth,
   the improvement comprising:
   means for discriminating against variable radio frequency signals occurring within said range of frequencies, said means including:
   means for comparing the frequencies of the detected radio frequency signals during each sweep of the local oscillator, and means for providing an alarm output in response to the occurrence of a detected radio frequency signal at the same frequency during multiple sweeps of the local oscillator.

3. In an apparatus for detecting the presence of fixed frequency continuous or pulsed radio frequency signals within an input range of frequencies, said apparatus including:
- a local oscillator,
- a limited bandwidth detector circuit,
- means for sweeping the frequency of the local oscillator over a range sufficiently large, and at a rate fast enough that any radio frequency signal occurring within said input range of frequencies will fall within the limited response bandwidth of said detector circuit,
- wherein said means for sweeping the frequency of the local oscillator includes a sweep generator providing a variable output signal for controlling the frequency of said local oscillator, clocking signals and a start signal representing the beginning of each sweep,
- said detector circuit providing a detect output pulse in response to sensing a radio frequency signal within its limited bandwidth,
- the improvement comprising:
- clock means responsive to said clocking signals for providing a first predetermined number of clock pulses during each sweep of the local oscillator,
- delay line means responsive to said clock pulses and to said detect output pulses for storing the detect pulses from one sweep of the local oscillator,
- means for comparing the detect output pulses from said detector circuit, and the detect pulses from a previous sweep stored in said delay line means for providing a correlated output pulse in response to the coincidence of said detect pulses and an uncorrelated output pulse whenever said detect pulses are not coincident,
- counter means for comparing the number of correlated output pulses to the number of uncorrelated output pulses during each said sweep, and
- means responsive to the status of said counter means at the beginning of each said sweep for providing an alarm output whenever the number of correlated output pulses bears a predetermined relationship to the number of uncorrelated output pulses.

4. The apparatus of claim 3 further including means responsive to a predetermined number of consecutive sweeps each containing correlated output pulses for providing an alarm output regardless of the number of uncorrelated signals detected.

5. The apparatus defined in claim 4 further including:
- means for providing a first output signal representing a correlation between sucessive sweeps,
- means for providing a second output signal whenever signals are present which are not correlated, and
- means for providing an alarm output whenever the number of correlated signals exceeds the number of uncorrelated signals by a predetermined number.

6. The apparatus defined in claim 5 further including:
- circuit means responsive to the presence of a correlated signal in the presence of multiple uncorrelated signals, and
- means for providing an alarm output whenever the number of consecutive sweeps including at least one correlated signal exceeds a second predetermined number.

7. The apparatus defined in claim 3, said predetermined relationship being satisfied when the number of correlated output pulses is greater than or equal to the number of uncorrelated output pulses.

8. The apparatus defined in claim 3, said predetermined relationship being satisfied when the number of correlated output pulses exceeds the number of uncorrelated output pulses.

9. The apparatus defined in claim 3, further including means for providing an alarm output whenever the number of consecutive sweeps each including at least one correlated output pulse exceeds a second predetermined number.

10. The apparatus of claim 1, further including third means for inhibiting said alarm output whenever the number of output pulses occurring at different times relative to said zero time reference during said first predetermined number of sweeps of the local oscillator bears a predetermined relationship to the number of output pulses occurring at the same time relative to said zero time reference during said first predetermined number of sweeps of the local oscillator.

11. The apparatus of claim 10, further including fourth means for providing an alarm output in response to the consecutive occurrence during each of a second predetermined number of sweeps of the local oscillator of at least one output pulse occurring at the same time relative to said zero time reference as an output pulse in a previous sweep.

12. The apparatus of claim 10, said predetermined relationship being satisfied when the number of output pulses occurring at different times relative to said zero time reference during said first predetermined number of sweeps of the local oscillator is greater than or equal to the number of output pulses occurring at the same time relative to said zero time reference during said first predetermined number of sweeps of the local oscillator.

13. The apparatus of claim 10, said predetermined relationship being satisfied when the number of output pulses occurring at different times relative to said zero time reference during said first predetermined number of sweeps of the local oscillator exceeds the number of output pulses occurring at the same time relative to said zero time reference during said first predetermined number of sweeps of the local oscillator.

14. The apparatus of claim 1, said receiver being a super-heterodyned receiver.

15. The apparatus of claim 14, further including third means for inhibiting said alarm output whenever the number of output pulses occurring at different times relative to said zero time reference during said first predetermined number of sweeps of the local oscillator bears a predetermined relationship to the number of output pulses occurring at the same time relative to said zero time reference during said first predetermined number of sweeps of the local oscillator.

16. The apparatus of claim 15, further including fourth means for providing an alarm output in response to the consecutive occurrence during each of a second predetermined number of sweeps of the local oscillator of at least one output pulse occurring at the same time relative to said zero time reference as an output pulse in a previous sweep.

17. The apparatus of claim 15, said predetermined relationship being satisfied when the number of output pulses occurring at different times relative to said zero time reference during said first predetermined number of sweeps of the local oscillator is greater than or equal to the number of output pulses occurring at the same time relative to said zero time reference during said predetermined number of sweeps of the local oscillator.

18. The apparatus of claim 15, said predetermined relationship being satisfied when the number of output pulses occurring at different times relative to said zero time reference during said first predetermined number of sweeps of the local oscillator exceeds the number of output pulses occurring at the same time relative to said zero time reference during said first predetermined number of sweeps of the local oscillator.

19. The apparatus of claim 2, further including inhibit means for inhibiting said alarm output in response to the occurrence of more detected radio frequency signals at a different frequency during multiple sweeps of the local oscillator than detected radio frequency signals at the same frequency during said multiple sweeps of the local oscillator.

20. The apparatus of claim 19, further including override means for providing an alarm output in response to the consecutive occurrence during each of multiple sweeps of the local oscillator of at least one detected radio frequency signal at the same frequency as a detected radio frequency signal in a previous sweep.

* * * * *